US008825877B2

(12) United States Patent
Kakadia

(10) Patent No.: US 8,825,877 B2
(45) Date of Patent: Sep. 2, 2014

(54) SESSION PERSISTENCE

(75) Inventor: Deepak Kakadia, Union City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1299 days.

(21) Appl. No.: 12/636,155

(22) Filed: Dec. 11, 2009

(65) Prior Publication Data

US 2011/0145420 A1 Jun. 16, 2011

(51) Int. Cl.
*G06F 15/16* (2006.01)

(52) U.S. Cl.
USPC ........... 709/228; 709/201; 709/224; 709/227; 709/238; 713/150

(58) Field of Classification Search
USPC ................. 709/228, 201, 227, 223, 238, 224; 713/150
See application file for complete search history.

(56) References Cited

U.S. PATENT DOCUMENTS

| | | | | |
|---|---|---|---|---|
| 6,704,768 B1 * | 3/2004 | Zombek et al. | | 709/201 |
| 6,856,991 B1 * | 2/2005 | Srivastava | | 1/1 |
| 7,003,571 B1 * | 2/2006 | Zombek et al. | | 709/227 |
| 7,003,574 B1 * | 2/2006 | Bahl | | 709/228 |
| 7,024,474 B2 * | 4/2006 | Clubb et al. | | 709/223 |
| 7,373,500 B2 * | 5/2008 | Ramelson et al. | | 713/150 |
| 7,418,498 B2 * | 8/2008 | Clubb et al. | | 709/224 |
| 7,454,489 B2 * | 11/2008 | Chauffour et al. | | 709/223 |
| 7,483,992 B2 * | 1/2009 | Bahl | | 709/228 |
| 7,689,696 B2 * | 3/2010 | Zombek et al. | | 709/227 |
| 7,693,981 B2 * | 4/2010 | Clubb et al. | | 709/223 |
| 7,895,256 B2 * | 2/2011 | Zombek et al. | | 709/200 |
| 7,921,225 B2 * | 4/2011 | Bonefas et al. | | 709/238 |
| 7,970,898 B2 * | 6/2011 | Clubb et al. | | 709/224 |
| 8,090,856 B1 * | 1/2012 | Bonefas et al. | | 709/230 |
| 8,200,829 B2 * | 6/2012 | Zombek et al. | | 709/227 |
| 8,301,766 B2 * | 10/2012 | Clubb et al. | | 709/224 |
| 8,370,435 B1 * | 2/2013 | Bonefas et al. | | 709/206 |
| 8,578,032 B2 * | 11/2013 | Zombek et al. | | 709/227 |
| 2006/0013147 A1 * | 1/2006 | Terpstra et al. | | 370/252 |

\* cited by examiner

*Primary Examiner* — Tammy Nguyen

(57) ABSTRACT

A system may include a number of load balancers configured to receive requests associated with a service, and a number of computer pools associated with the load balancers, where each of the computer pools includes a number of computers. The system may also include a memory accessible to each of the computers, the memory being configured to store state information associated with a client session involving a first client device requesting the service. A first one of the computers may be configured to perform a portion of processing associated with the client session and forward first state information regarding the processing to the memory. A second one the computers may be configured to perform an other portion of the processing associated with the client session and forward second state information to the memory. The memory is configured to store the first and second state information.

20 Claims, 9 Drawing Sheets

SESSION PERSISTENCE

BACKGROUND INFORMATION

Service providers often attempt to balance the processing load associated with providing their services. One drawback with conventional load balancing is that the load balancing is typically performed across multiple layers and platforms. As a result, there are multiple levels of failure associated with the load balancing.

For example, in conventional network architectures, a client device may connect with a router to attempt to access a service. The router may interact with one or more domain name systems (DNSs) and global load balancing platforms to identify an Internet protocol (IP) address associated with the desired service. Once an IP address is identified, the router may forward the request to a local load balancing platform that will attempt to forward the request to an available server. Such an approach has many drawbacks. For example, the client may receive an initially valid IP address from a DNS resolver, but accessing the desired service may fail at any point in time thereafter. In such instances, the client will not know whether there is an alternate IP address for the service. Therefore, the client will try to connect to the IP address, wait a period of time and retry to establish a connection one or more times. During this period of time, the DNS entry in the client may expire based on a time-to-live (TTL) value and the DNS server will have to be queried again for a new valid IP address. Such processing consumes time and significant network resources.

Another problem with conventional network architectures is the inability to recover from problems that may occur during processing in an efficient manner. Still further, conventional load balancing architectures often do not permit processing to be performed across multiple load balancing platforms. For example, conventional architectures often require that a single server perform all the processing associated with a client session.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to an architecture that provides load balancing associated with a service, such as an IP-related service. In one implementation, the architecture provides an integrated control and data plane that provides a number of load balancers accessible via a single virtual IP (VIP) address. In addition, services performed by server devices connected to the load balancers may store state information associated with a client session. The state information may be used when multiple servers are used to process a single client session.

Figure 1:
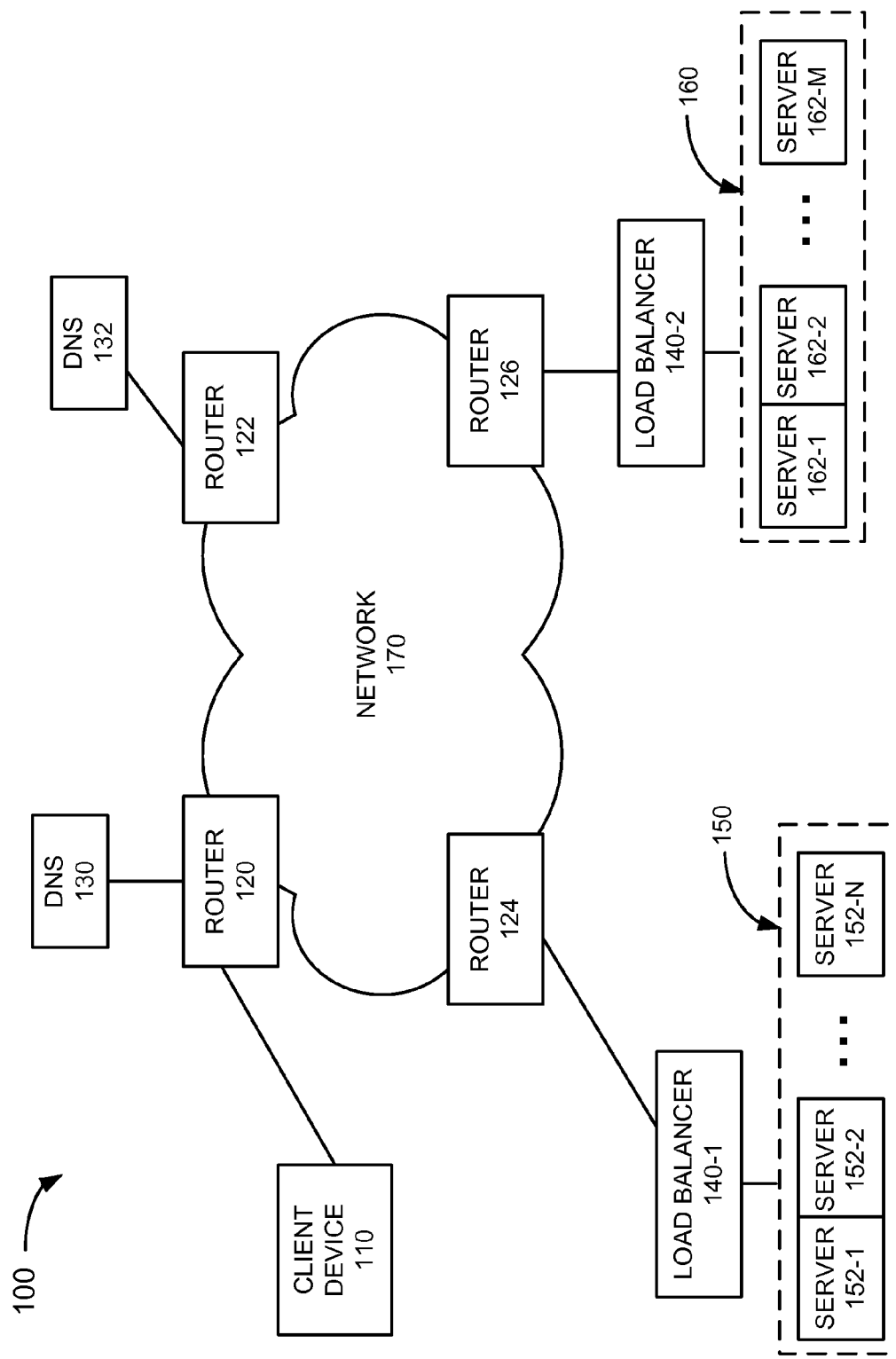
FIG. 1 illustrates an exemplary network in which systems and methods described herein may be implemented.

FIG. 1 is a block diagram of an exemplary network 100 in which systems and methods described herein may be implemented. Network 100 may include client device 110, routers 120, 122, 124 and 126, domain name system (DNS) 130 and DNS 132. Network 100 may also include load balancers 140-1 and 140-2, referred to individually as load balancer 140 or 140-N and collectively as load balancers 140, server pool 150 and server pool 160. Network 100 may further include network 170.

Client device 110 may include any type of device that is able to transmit and receive data, such as text data, video data, image data, audio data, multi-media data, etc. In an exemplary implementation, client device 110 may include some type of computer, such as a personal computer (PC), laptop computer, etc., a personal digital assistant (PDA), a web-based appliance, a mobile terminal (e.g., a cellular telephone), etc.

Routers 120, 122, 124 and 126 may each include any type of network routing device, such as a router or switch, used to receive incoming communications, identify destination information associated with the incoming communication and route the communication toward its intended destination. DNS 130 and DNS 132 may each include one or more devices/systems that translate or resolve a name associated with a destination or service to an address (e.g., an IP address).

Load balancers 140 may each include one or more logic devices that receive communications and identify an appropriate server from a local server pool (e.g., server pool 150 or 160) to process the communications. In an exemplary implementation, load balancers 140 may identify congested servers or unavailable servers in server pools 150 and 160 and avoid sending communications to the congested/unavailable servers.

Server pools 150 and 160 may each include a number of servers or other computing devices associated with servicing customer requests. For example, server pool 150 may include a number of servers labeled 152-1 through 152-N, where N represents any integer. Similarly, server pool 160 may similarly include a number of servers labeled 162-1 through 162-M, where M represents any integer.

Network 170 may include one or more wired, wireless and/or optical networks that are capable of receiving and transmitting data, voice and/or video signals, including multimedia signals that include voice, data and video information. For example, network 170 may include one or more public switched telephone networks (PSTNs) or other type of switched network. Network 170 may also include one or more wireless networks and may include a number of transmission towers for receiving wireless signals and forwarding the wireless signals toward the intended destinations. Network 170 may further include one or more satellite networks, one or more packet switched networks, such as an IP based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, one client device 110, four routers 120-126, two DNSs 130 and 132, two load balancers 140 and two server pools 150 and 160 are shown for simplicity. It should be understood that network 100 may include a large number (e.g., hundreds or thousands) of client devices, routers, load balancers, DNSs and server pools. Network 100 may also include additional elements, such as switches, gateways, backend systems, etc., that aid in routing information in network 100. In addition, although the various devices illustrated in FIG. 1 are shown as separate devices in FIG. 1, in other implementations, the functions performed by two or more of these devices may be performed by a single device or platform. In addition, in some implementations, the functions described as being performed by a particular device may alternatively be performed by a different device.

Figure 2:
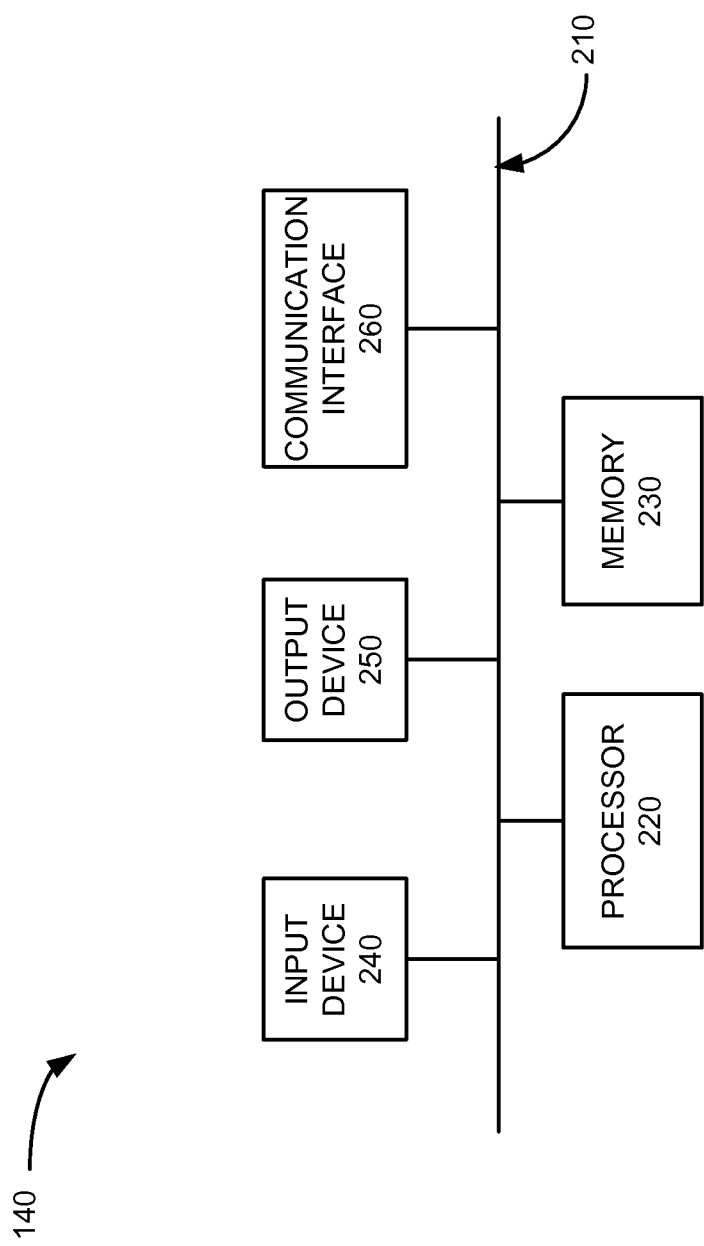
FIG. 2 illustrates an exemplary configuration of one or more of the components of FIG. 1.

FIG. 2 illustrates an exemplary configuration of load balancer 140. Client device 110, routers 120-126, DNS 130 and 132, and each of the servers in server pools 150 and 160 may be configured in a similar manner. Referring to FIG. 2, load balancer 140 may include a bus 210, a processor 220, a memory 230, an input device 240, an output device 250 and a communication interface 260. Bus 210 may include a path that permits communication among the elements of load balancer 140.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to load balancer 140, such as a keyboard, a keypad, a mouse, a pen, a microphone, a touch screen, voice recognition and/or biometric mechanisms, etc. Output device 250 may include a mechanism that outputs information to the user, including a display, a printer, a speaker, etc.

Communication interface 260 may include any transceiver-like mechanism that load balancer 140 may use to communicate with other devices (e.g., router 124, router 126, server pool 150, server pool 160, etc.). For example, communication interface 260 associated with load balancer 140-1 may include mechanisms for communicating with router 124 and each of the servers 152 in server pool 150 via wired, wireless or optical mechanisms. Communication interface 260 may also include one or more radio frequency (RF) transmitters, receivers and/or transceivers and one or more antennas for transmitting and receiving RF data via network 170. Communication interface 260 may also include a modem or an Ethernet interface to a LAN or other mechanisms for communicating via a network, such as network 170 or another network via which load balancer 140 communicates with other devices/systems.

The exemplary configuration illustrated in FIG. 2 is provided for simplicity. It should be understood that load balancer 140 (and routers 120-126, DNS 130 and 132 and client device 110) may include more or fewer devices than illustrated in FIG. 2.

In an exemplary implementation, load balancer 140 may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
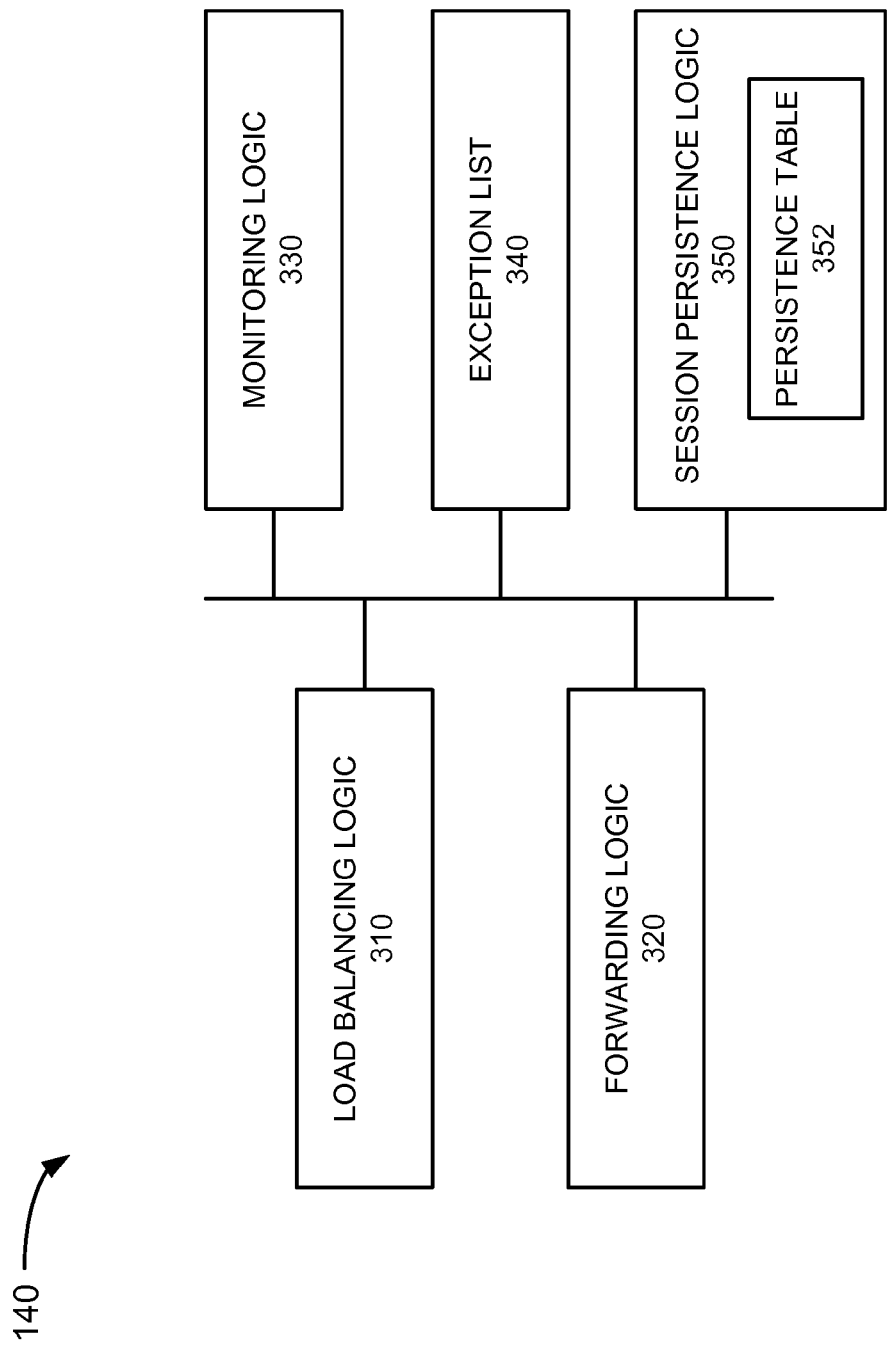
FIG. 3 illustrates an exemplary configuration of logic components implemented in one of the load balancers of FIG. 1.

FIG. 3 is an exemplary functional block diagram of each load balancer 140 according to an exemplary implementation. The logical blocks illustrated in FIG. 3 may be implemented in software, hardware, or a combination of hardware and software. For example, in one implementation, all or some of the logical blocks illustrated in FIG. 3 may be implemented by processor 220 (FIG. 2) executing software instructions stored in, for example, memory 230.

Referring to FIG. 3, load balancer 140 may include load balancing logic 310, forwarding logic 320, monitoring logic 330, exception list 340 and session persistence logic 350. Load balancing logic 310 may include logic for controlling the operation of load balancer 140. For example, load balancing logic 310 may identify an appropriate one of servers in server pool 150 (or server pool 160) to which communications from client devices, such as client device 110, should be forwarded. In an exemplary implementation, load balancing logic 310 may identify congested servers, unavailable servers, etc., and avoid sending client requests to such servers, as described in detail below.

Forwarding logic 320 may include logic for forwarding communications, such as client requests destined for one of servers 152 or 162. For example, forwarding logic 320 may forward client requests associated with access to a service in accordance with information from load balancing logic 310.

Monitoring logic 330 may include logic for monitoring servers 152 in server pool 150 (and/or servers 162 in server pool 162). For example, in one implementation, monitoring logic 330 in load balancer 140-1 may run a background daemon that continuously or periodically monitors the state of each of servers 152 in server pool 150. Monitoring logic 330 in load balancer 140-2 may perform a similar process with respect to servers 162 in server pool 160, as described in detail below. Monitoring logic 330 may then determine whether a server included in server pool 150/160 should be removed from the pool of available servers to process client requests.

Exception list 340 may include one or more memories for storing information identifying, for example, congested or overloaded servers that are no longer available to process client requests. For example, monitoring logic 330 may identify servers that are currently unavailable for processing client requests and store information identifying the unavailable servers in exception list 340. Load balancing logic 310 may access exception list 340 when identifying an appropriate server to process a client request. In an exemplary implementation, exception list 340 may be implemented using a high speed, ternary content addressable memory (TCAM). Alternatively, exception list 340 may be implemented using a high speed, static random access memory (SRAM) or via any other memory device.

Session persistence logic 350 may store state information associated with a client session. For example, a single session and/or transaction associated with a client request may include many sub-transactions that are performed by different ones of servers 152 and/or 162. In such instances, session persistence logic 350 may store state information associated with each of the sub-transactions in persistence table 352. Persistence table 352 may include one or more memory devices that include one or more databases that store and index the state information. In an alternative implementation, session persistence logic 350 and/or session persistence table 352 may be located externally with respect to load balancer 140, as described in detail below. In each case, if a problem occurs during a transaction, one of servers 152 and/or 162 may access persistence table 352 to ensure that the transaction may be completed, as described in detail below.

Load balancer 140 may receive communications from client devices, such as client device 110, intended for a service provider associated with servers 152/162 in server pools 150 and 160. Load balancer 140-1 may then identify an appropriate one of servers 152/162 to which communications are to be forwarded, as described in detail below.

Figure 4:
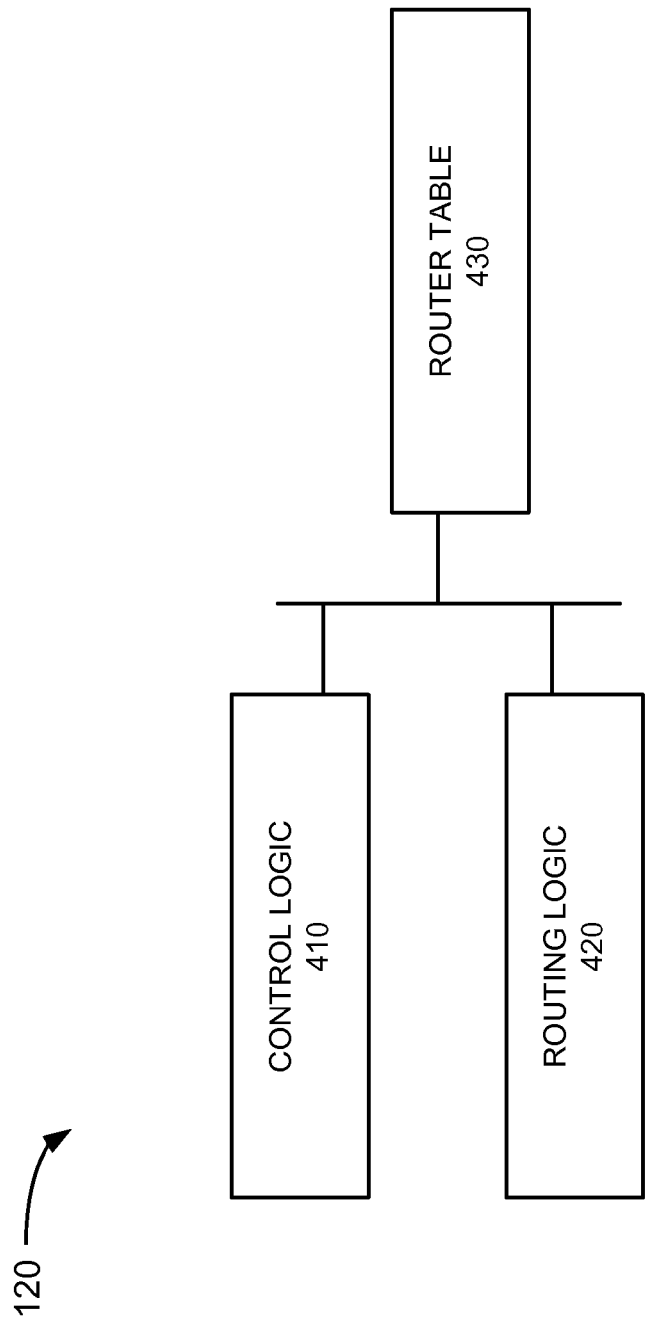
FIG. 4 illustrates an exemplary configuration of logic components implemented in one of the routers of FIG. 1.

FIG. 4 is an exemplary functional block diagram of components implemented in router 120 of FIG. 2. Routers 122, 124 and 126 may be configured in a similar manner. Referring to FIG. 4, router 120 may include control logic 410, routing logic 420 and router table 430.

Control logic 410 may include logic for controlling the operation of router 120. For example, control logic 410 may receive communications from client devices, such as client device 110, and forward the communication or a portion of the communication (e.g., the header information) to routing logic 420. Control logic 410 may also update router tables (e.g., router table 430) based on messages received from other routers in network 100. Control logic 410 may also generate or update one or more forwarding tables (not shown in FIG. 4) based on information in the router tables.

Routing logic 420 may include logic for identifying forwarding information associated with received communications. For example, routing logic 420 may access one or more router tables to identify a next hop for a received communication based on destination information (e.g., a destination IP address and/or port) included in a header of a received communication. Routing logic 420 may also receive messages, such as advertisement messages, including address information associated with devices/services in network 100.

Router table 430 may include one or more memories for storing data. For example, router table 430 may store information associated with other routers and/or services in network 100. In an exemplary implementation, control logic 410 and/or routing logic 420 may store information associated with advertised addresses in router table 430, as described in detail below.

Figure 5:
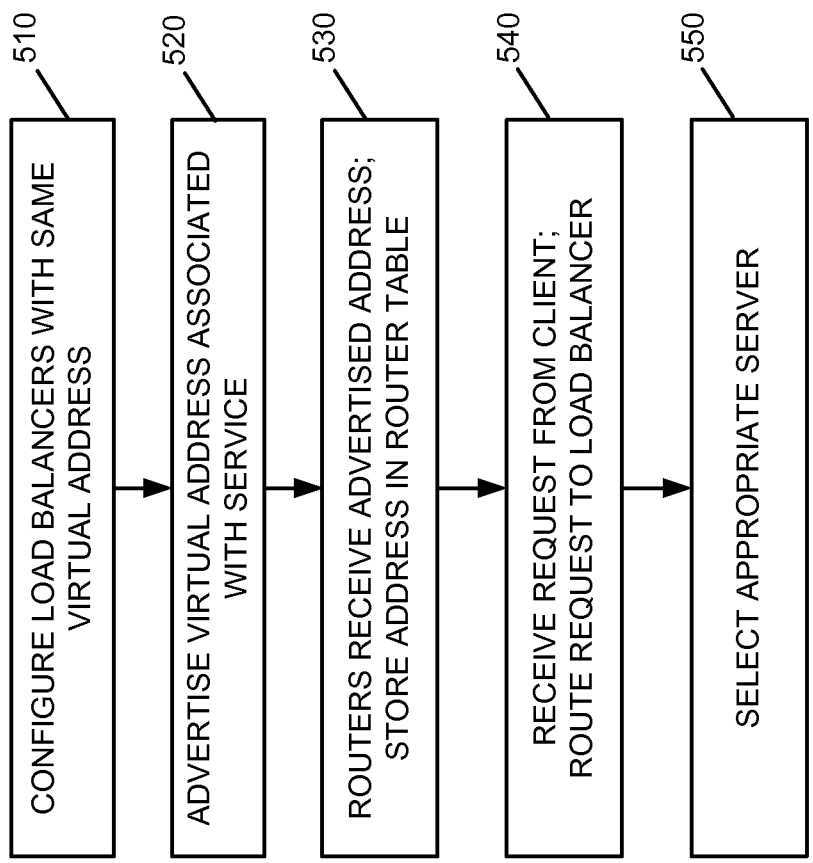
FIG. 5 is a flow diagram illustrating exemplary processing associated with the components of FIG. 1.

FIG. 5 is a flow diagram illustrating exemplary processing associated with network 100. In this example, assume that load balancers 140-1 and 140-2 are associated with a service provided by an entity via servers in server pools 150 and 160. For example, load balancers 140-1 and 140-2 may be associated with providing videos-on-demand, televisions shows, podcasts, music, etc., or providing some other service. Processing may begin by configuring load balancers 140-1 and 140-2 with the same virtual IP (VIP) address (act 510). Using a VIP address associated with multiple load balancers 140 allows DNSs 130 and 132 to store a single IP address for a particular service provided by a service provider associated with load balancers 140 and server pools 150 and 160. Using a single VIP address also allows a service provider to configure load balancers 140-1 and 140-2 in an identical manner, which simplifies the configuring and maintenance associated with load balancers 140.

Continuing with the example above, assume that a service provider associated with the service provided via servers in server pools 150 and 160 configures a service VIP address on a loopback interface of load balancers 140-1 and 140-2 to each have the IP address of 1.1.1.1. This VIP address may represent the IP address for a service to be provided by one or more servers 152 or 162 in server pool 150 or 160, respectively. It should be understood that the VIP address of 1.1.1.1 is used for explanatory purposes and any particular VIP address may be assigned to load balancers 140.

Further assume that the physical interface that connects load balancer 140-1 to its closest router (i.e., router 124 in this example), has been assigned the network IP address of 192.168.1.2. Also assume that the physical interface that connects load balancer 140-2 to its closest router (i.e., router 126 in this example) has been assigned the network IP address of 172.1.1.2. In this example, load balancer 140-1 may advertise the VIP address 1.1.1.1/32 to network 170 and load balancer 140-2 may advertise the VIP address of 1.1.1.1/32 to network 170 (act 520). For example, load balancers 140-1 and 140-2 may advertise the VIP address via interior gateway protocol (IGP) route updates that are periodically transmitted to network 170.

Routers in network 170 may receive the advertisements (act 530). For example, router 124 may receive the advertisement from load balancer 140-1 and router 126 may receive the advertisement from load balancer 140-2. Routers 124 and 126 may forward the advertised VIP address to other routers in network 170. For example, routers 124 and 126 may forward the VIP address of 1.1.1.1/32 to router 120.

Figure 6:
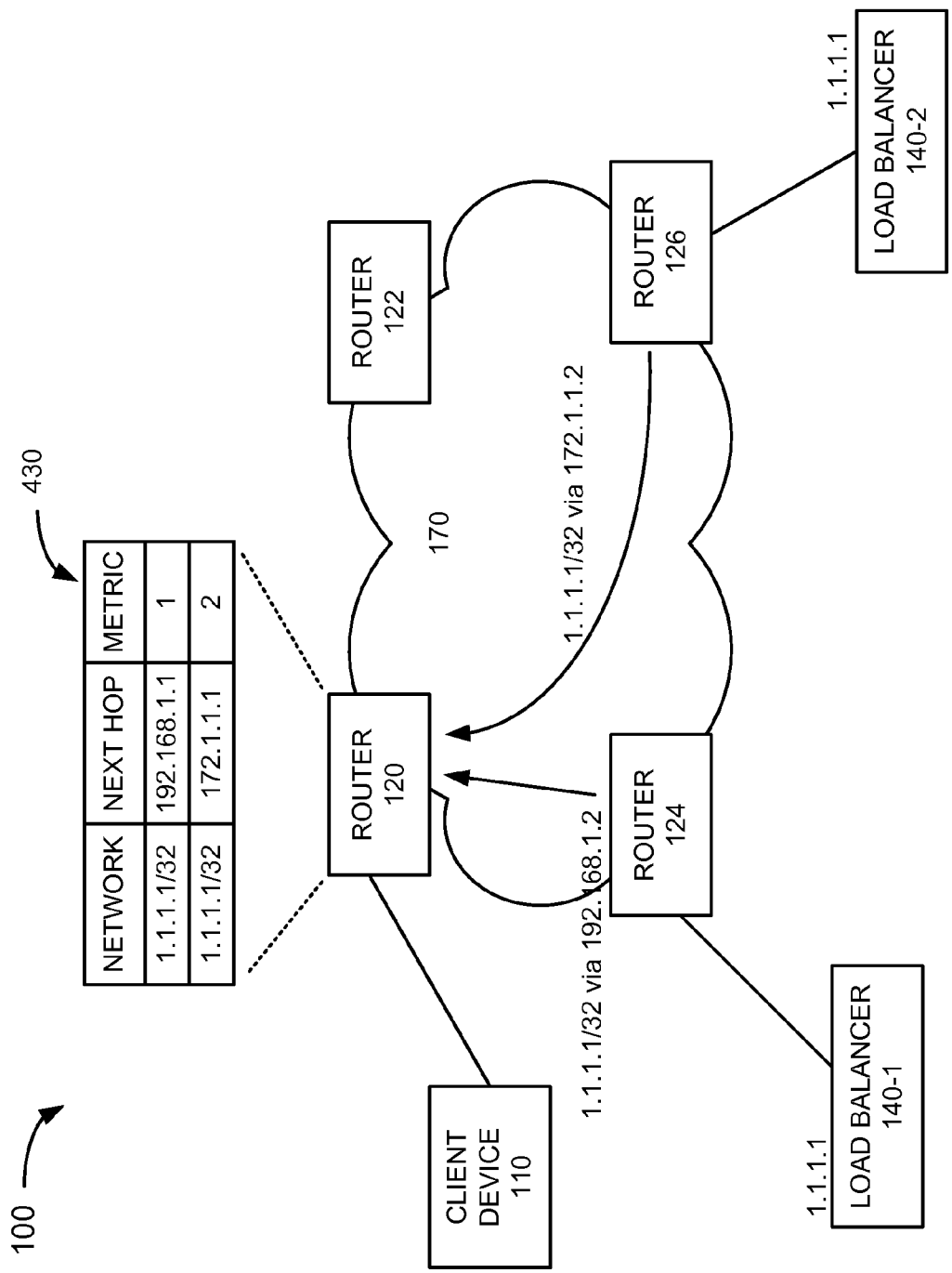
FIG. 6 illustrates a portion of the network of FIG. 1 associated with the processing of FIG. 5.

For example, FIG. 6 illustrates a portion of network 100 associated with the advertising messages forwarded to router 120. Referring to FIG. 6, router 124 may forward the VIP address of 1.1.1.1/32 via 192.168.1.2, as indicated by the line from router 124 to router 120. Similarly, router 126 may forward the VIP address of 1.1.1.1/32 via 172.1.1.2, as indicated by the line from router 126 to router 120. Router 120 may store the information associated with the VIP advertisements in router table 430 (act 530).

For example, FIG. 6 illustrates an exemplary portion of router table 430. As illustrated, routing table 430 may include a network address field, a next hop field and a metric field. The metric field illustrated in router table 430 may store the number of hops to a particular router. For example, router 124 may have an address of 192.168.1.1 and may be located one hop away from router 120, while router 126 may have a network address of 172.1.1.1 and may be located two hops away from router 120. In some implementations, control logic 410 may access a forwarding table that includes more detailed information with respect to routing a client request to one of load balancers 140.

Router 120 may receive requests from client devices, such as client device 110, and use information in its routing table 430 to automatically forward and/or load balance requests from client devices to service VIP address 1.1.1.1 based on various metrics (act 540). As an example, assume that the user at client device 110 enters a name associated with the service provided by load balancers 140 and server pools 150/160 into a web browser at client device 110 and forwards the request to router 120. Router 120 may access DNS 130 (FIG. 1) to identify an IP address associated with the name of the service. As described above, DNS 130 (and DNS 132) may store the VIP address of 1.1.1.1 as the IP address corresponding to the name of the service associated with load balancers 140. In this case, the VIP address of 1.1.1.1 may be returned to router 120.

In this example, assume that router 120 is operating in accordance with open shortest path first (OSPF) routing protocol. Routing logic 420 may then access router table 430 and determine that the IP address of 1.1.1.1 may be located one hop away via router 124 and two hops away via router 126. In this example, routing logic 420 may select router 124 as the next hop router. In other implementations, router 120 may use different routing metrics/criteria when identifying a path for forwarding client requests to one of load balancers 140-1 or 140-2.

For example, load balancer 140-1 may alter the weighting associated with routing requests from router 120, based on, for example, link cost information associated with forwarding the request, load and/or latency information associated with servers 152 and/or 162, server availability information associated with servers 152 and/or 162, or other information. In such implementations, load balancer 140-1 may incorporate these other metrics in the advertisement message that will be received by router 120. As one example, if none of the servers 152 in server pool 150 is available or all of servers 152 are experiencing significant latency problems, load balancer 140-1 may insert latency information indicating that requests to load balancer 140-1 will experience delays. In such an instance, router 120 may use this latency metric and forward requests destined for VIP address 1.1.1.1 to router 126 and eventually load balancer 140-2, even though router 126 is located further from router 120 than router 124. In this manner, router 120 may effectively participate in the load balancing with respect to forwarding client requests to one of load balancers 140-1 or 140-2.

In this example, assume that router 120 routes the request from client device 110 to load balancer 140-1 via router 124. Load balancer 140-1 may then select the appropriate server in server pool 150 to process the client request (act 550). For example, load balancer 140 may perform a load balancing function to identify one of servers 152 to service the client request, as described in detail below.

Figure 7:
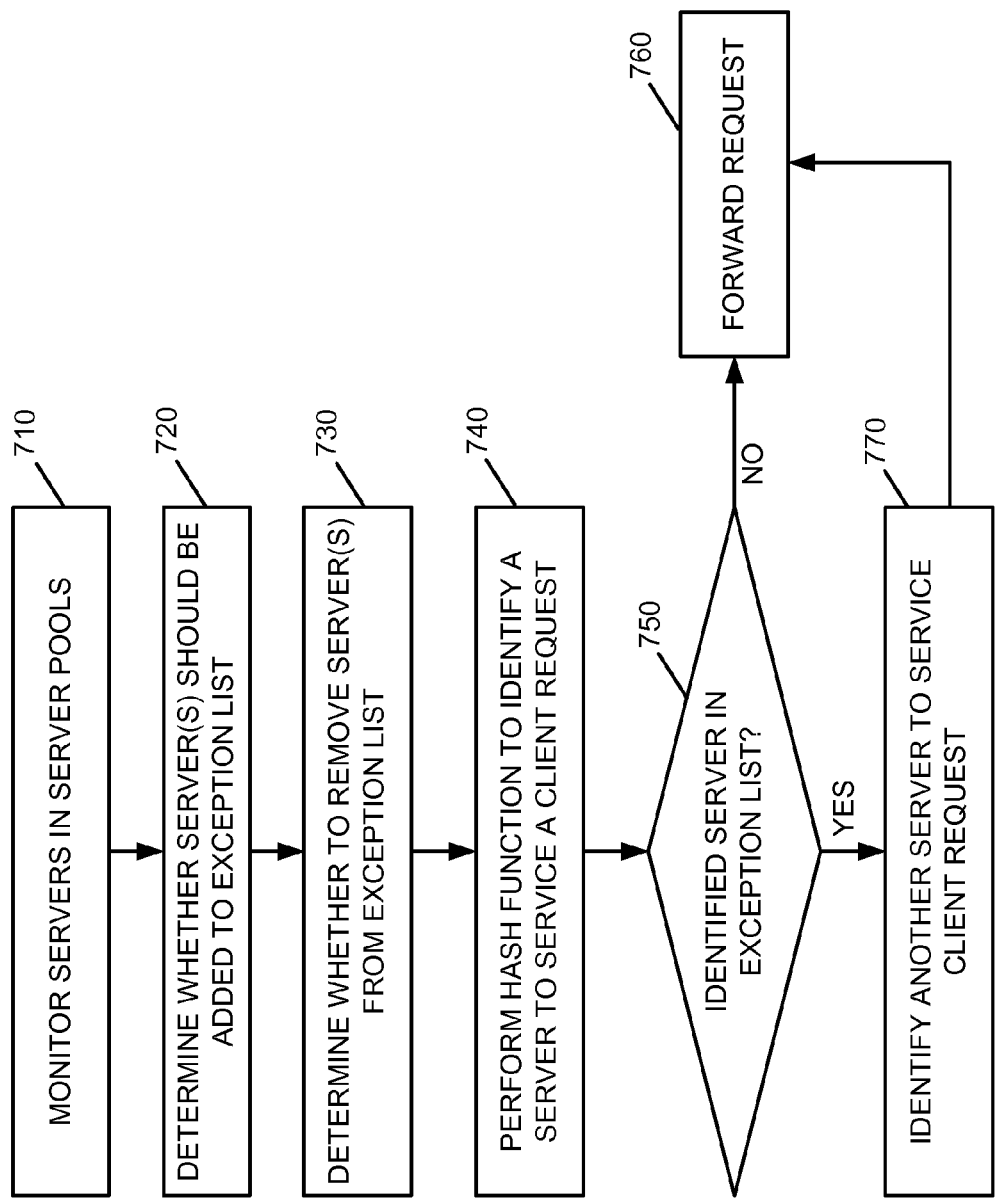
FIG. 7 is a flow diagram illustrating exemplary processing associated with the load balancer of FIG. 3.

FIG. 7 illustrates exemplary processing associated with selecting the appropriate server discussed above with respect to act 550. Processing may begin with load balancer 140-1 monitoring servers in server pool 150 (act 710). For example, as described above, monitoring logic 330 may run a background daemon that monitors the state of each of the servers 152-1 through 152-N in server pool 150. In one implementation, the daemon may perform periodic health checks to determine the state of servers 152.

For example, monitoring logic 330 may generate requests that may be similar to actual client requests and forward the requests to each of servers 152-1 through 152-N in server pool 150. Monitoring logic 330 may then record response times, delays or other measurements associated with responses to each of the requests from each of servers 152-1 through 152-N. Monitoring logic 330 may then determine whether any of servers 152 should be added to exception list 340 as being unavailable for processing client requests (act 720). For example, if monitoring logic 330 determines that the delay associated with server 152-2 processing a client request is above a predetermined threshold, monitoring logic 330 may add server 152-2 to exceptions list 340. As discussed above, a server 152 identified in exception list 340 may be unavailable to process client requests.

Alternatively, if monitoring logic 330 determines that a server 152 stored in exception list 340 has recovered (e.g., the latency associated with processing a client request is now below the predetermined threshold), monitoring logic 330 may remove that server 152 from exceptions list 340 (act 730). In some implementations, monitoring logic 330 may also monitor the availability of the VIP address (e.g., 1.1.1.1 in this example) and load balancer 140 may withdraw the advertisement of the VIP address if the VIP address (e.g., 1.1.1.1) itself is not available. In still other implementations, if monitoring logic 330 determines that all servers 152 in server pool 150 are not performing satisfactorily, load balancer 140 may withdraw the advertisement associated with VIP address 1.1.1.1.

Assume that client device 110 requests a service associated with the VIP address (i.e., 1.1.1.1) corresponding to load balancer 140-1 via router 120, as described above with respect to FIG. 5. Load balancing logic 310 may identify one of servers 152-1 through 152-N in server pool 150 to receive the request (act 740). For example, load balancing logic 310 may perform a hash function to identify a target server in server pool 150. In one implementation, load balancing logic 310 may perform a hash of the source IP address, destination IP address, source port and destination port associated with the client request. Alternatively, load balancing logic 310 may perform a hash function based on a subset (e.g., two or more) of the source IP address, destination IP address, source port or destination port. In still other alternatives, load balancing logic 310 may hash on other information associated with the client request. In each case, the output of the hash function may then be mapped to one of servers 152-1 through 152-N.

After computing the hash function, load balancing logic 310 may access exception list 340 to determine whether the identified server is in exception list 340 (act 750). If the identified server is not in exception list 340 (act 750—no), the request from client device 110 may be forwarded to the target server (act 760). The target server 152 may then respond to the client request (e.g., provide the desired service, information, etc.).

If, however, the target server 152 is in exception list 340 (act 750—yes), this may mean that the target server 152 cannot handle client requests. In this case, load balancing logic 310 may compute another hash function to find another target server 152 in server pool 150 (act 770). For example, load balancing logic 310 may compute a hash value based on information other than that used in the first hash function. Alternatively, load balancing logic 310 may identify the next sequential server in server pool 150. For example, if the initial hash function output is mapped to target server 152-3 and server 152-3 is identified in exception list 340, monitoring logic 310 may identify server 152-4 as the target server. If server 152-4 is in exception list 340, load balancing logic 310 may continue to attempt to identify an available server by either executing a different hash function or selecting another one of the available servers not in exception list 340. Once an available server is identified, the client request may be forwarded to the identified target server 152 (act 760). The target server may then respond to the client request (e.g., provide the desired service, information, etc.).

In an exemplary implementation, load balancer 140-1 may not require the load to be balanced across each of servers 152-1 through 152-N. For example, in some implementations, results of the hashing function that identify a target server may result in one of servers 152 receiving more requests than another one of servers 152. In such an implementation, as long as the server 152 processing the most client requests is not overloaded, no additional load balancing may be needed. As an example, servers 152-1, 152-2 and 152-3 may be handling 10%, 20% and 70%, respectively, of client requests. As long as monitoring logic 310 determines that server 152-3 is not overloaded or congested, no additional load balancing between servers 152 is required. This may save additional time with respect to processing client requests as compared to load balancing in an environment where each server 152 must handle approximately the same load.

As discussed above, server pools 150 and 160 may each include a number of different servers. In some implementations, a client session may be made of many sub-transactions that span several different servers 152 and/or 162. In such a case, load balancer 140 may implement session persistence functionality. For example, session persistence logic 350 (FIG. 3) may store state information associated with a session in persistence table 352.

In one implementation, session persistence logic 350 may receive state information from each of servers 152 and 162 that may be performing processing associated with a client session. For example, load balancers 140 and servers 152/162 may share information using a protocol that allows state information to be forwarded from servers 152/162 to load balancers 140. In such an implementation, load balancers 140-1 and 140-2 may receive and/or request state information from servers 152/162. Session persistence logic 350 may store the state information in persistence table 352, which may be globally accessible to each of servers 152 and/or 162. In this manner, each of servers 152 and/or 162 may access state information stored in persistence table 352 to retrieve information associated with a client session.

Figure 8:
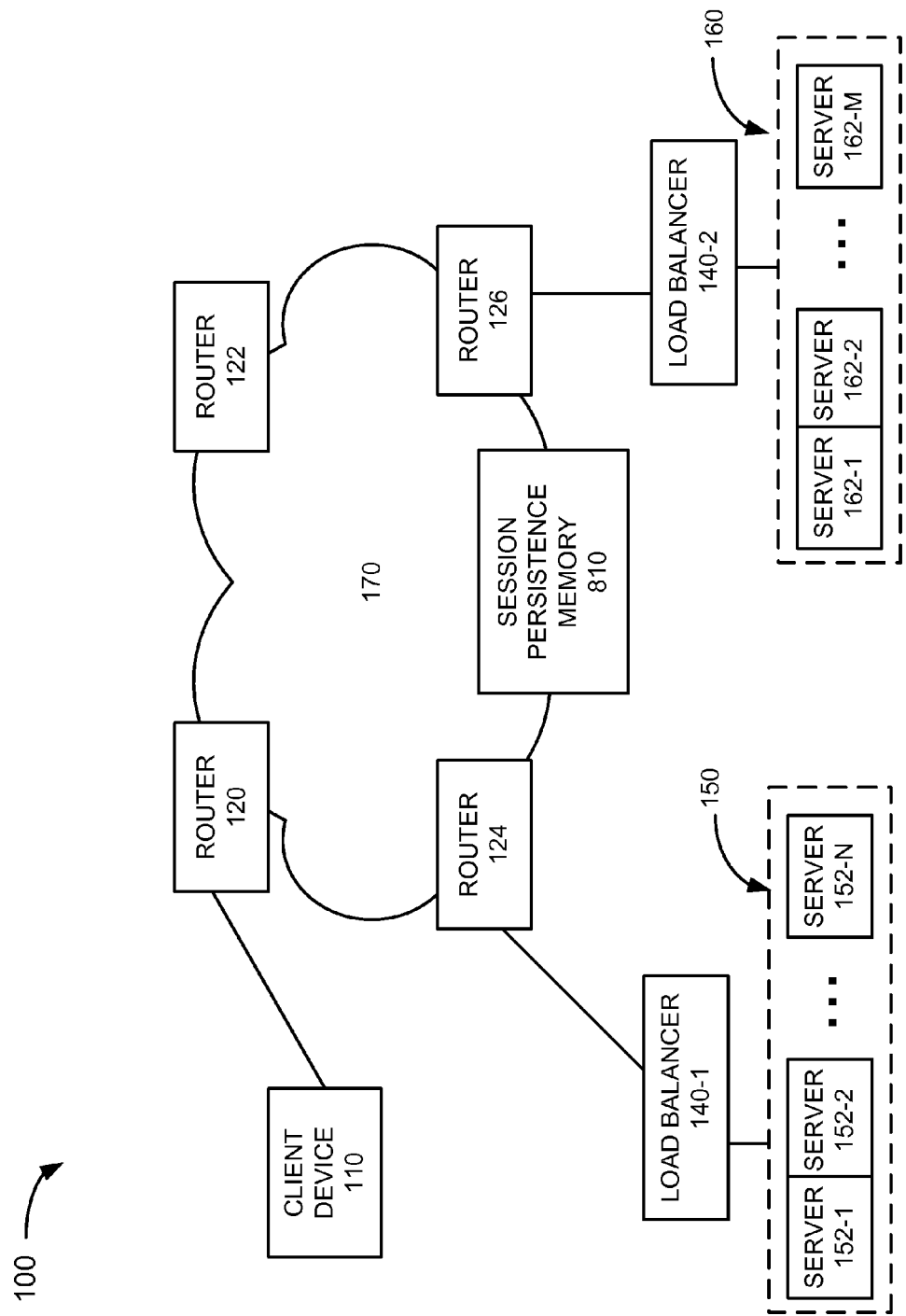
FIG. 8 illustrates a portion of the network of FIG. 1 associated with storing state information associated with a client session.

In another implementation, each of servers 152 and 162 may store state information in a globally accessible memory that is not contained within one of load balancers 140 and/or server pools 150 or 160. For example, FIG. 8 illustrates an exemplary portion of network 100 that includes a globally accessible memory for storing state information associated with a client session. Referring to FIG. 8, session persistence memory 810 may be located anywhere in network 100 that is accessible to each of servers 152 and 162. In this case, each of servers 152 and/or 162 may update session persistence memory 810 with state information regarding a client session that is in progress and also access session persistence memory 810 to retrieve state information, as described in detail below.

Figure 9:
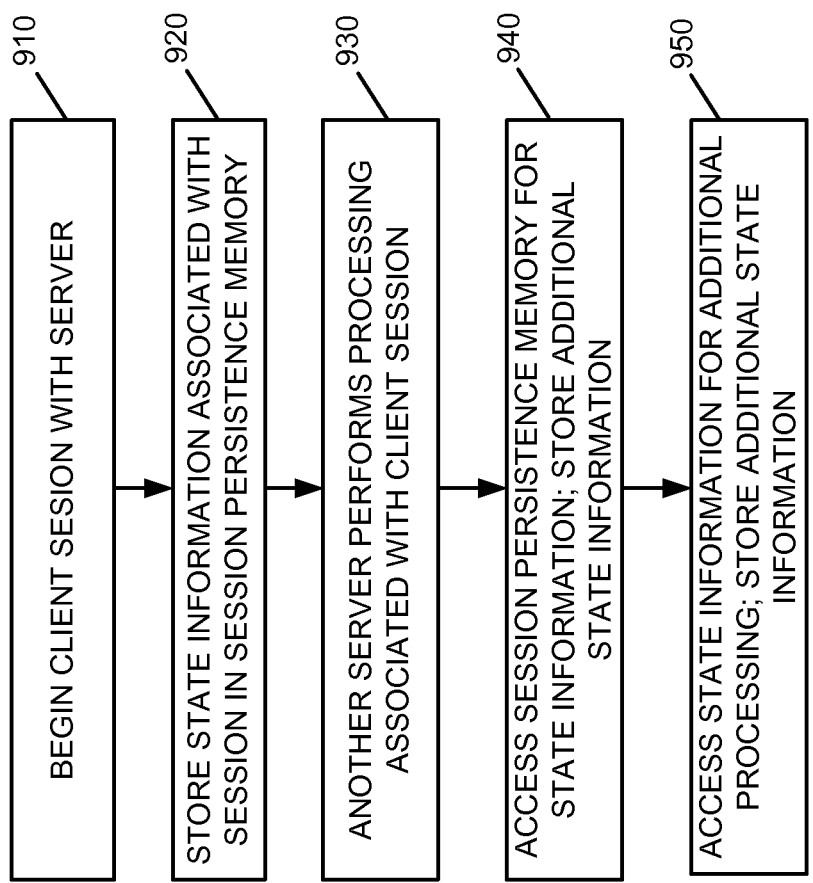
FIG. 9 is a flow diagram illustrating exemplary processing associated with the portion of the network illustrated in FIG. 8.

FIG. 9 illustrates exemplary processing associated with client session persistence. Processing may begin with client device 110 being connected to one of servers 152 in server pool 150, as described above with respect to FIG. 7. For example, assume that client device 110 has connected with server 152-2. A client session between client device 110 and server 152-2 may then commence (act 910).

For example, client device 110 may request a particular service provided by server 152-2. Server 152-2 may then service the customer request. As server 152-2 is servicing the request, server 152-2 may store state information associated with the transaction in session persistence memory 810 (act 920). The state information may allow other servers or server 152-2 to access the state information in case a problem occurs during the transaction or in situations where a transaction or client session spans several of servers 152.

For example, assume that a client session with server 152-2 involves performing a banking transaction. In such a situation, the services associated with performing the transaction may include many sub-transactions. For example, the banking transaction may include several sub-transactions (e.g., accessing a client's banking records, retrieving security-related information associated with the client's account, etc.) that may be performed by several of servers 152 to provide the client with a quicker service, as opposed to using a single server (e.g., server 152-2).

In this example, assume that server 152-2 is retrieving banking information associated with the user at client device 110, while another server 152, such as server 152-3, may be used to perform a security check on information provided by the user during the initial interaction with server 152-2 (act 930). In this case, server 152-3 may access state information stored in session persistence memory 810 associated with the transaction (act 940).

For example, server 152-3 may access a portion or all of the state information stored by server 152-2 in session persistence memory 810. Such information may be needed to allow server 152-3 to perform its sub-transaction. Server 152-3 may then perform the desired sub-transaction (e.g., verify the user's information). Server 152-3 may also store state information associated with its sub-transaction in session persistence memory 810 (act 940).

Server 152-2 may similarly use all or some of the information stored by server 152-3 in session persistence memory 810 to continue the client session (act 950). Server 152-2 may also continue to store state information associated with its processing in session persistence memory 810 (act 950). In this manner, session persistence memory 810 may facilitate efficient processing of a service provided by a service provider.

As another example, client sessions may span multiple server pools. For example, assume that client device 110 is a mobile device (e.g., cell phone) that requests a service associated with receiving downloaded content (e.g., movies, music, television shows, podcasts, etc.). Further assume that client device 110 initially establishes a session with server 152-1 to receive content via, for example, network 170. In this case, assume that the user of client device 110 is traveling in a car as client device 110 is requesting/accessing the service.

The service provider may move the client session to another one of the server pools based on the geographic location of client device 110. For example, the service provider may move the client session from server 152-1 to server 162-3 in response to movement of client device 110. That is, a DNS lookup performed by DNS 132 may identify load balancer 140-2 as the load balancer 140 to service the request after client device 110 has moved to a new location. In such a scenario, server 162-3 may access session persistence memory 810 to determine the state of the client session. For example, server 162-3 may identify the state of a particular download and continue to provide the downloaded content to client device 110. The state information may include, for example, a number of bytes downloaded to client device 110, a bit rate for downloading content to client device 110, a time, location and/or other information identifying a portion of the file that has been downloaded, etc. Server 162-3 may then use the stored state information to provide the remaining portion of the downloaded content to client device 110.

In each case, servers located across different server pools (e.g., server pools 150 and 160) may store information in session persistence memory 810, access the stored state information and perform portions of a transaction/processing associated with a client session to efficiently provide the desired service.

In other instances, information stored in client persistence memory 810 may be used by one or more of servers 152 and/or 162 to recover from an error. For example, continuing with the example above regarding downloading content from servers 152/162, information stored in session persistence memory 810 may allow a recovering server to identify a portion of content that was successfully downloaded (e.g., in bytes), a bit rate for the remaining portion of the download, etc. This may enable server pools 150 and 160 to avoid losing information associated with a transaction that is in progress, as well as to efficiently recover from an error during processing.

Implementations described herein provide for load balancing the processing associated with a service over a number of server or computer devices. In addition, state information associated with a client session may be stored to allow for efficient utilization of resources when a transaction spans a number of different servers and/or server pools.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, one or more load balancers 140 and server pools 150/160 were described as being associated with a service provider providing a particular service (e.g., IP-based service). In some implementations, load balancers 140 may be operated and/or provided by an entity that is distinct from the entity providing the service. For example, an entity associated with managing resources for a service provider may operate load balancers 140 on behalf of the entity associated with the server pools (e.g., server pools 150 and 160).

In addition, features have been described above with respect to servers 150 and 160 accessing a session persistence memory 810 that is accessible to all servers 150/160 via a network. In some implementations, session persistence memory 810 may be located in one of server pools 150/160 or in one of load balancers 140. In still other implementations, multiple session persistence memories may be distributed throughout network 100. In such implementations, the multiple session persistence memories may communicate with one another to share state information so that each session persistence memory includes the same information.

In addition, while series of acts have been described with respect to FIGS. 5, 7 and 9, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A system, comprising:
    a plurality of load balancers configured to receive requests associated with a service;
    a plurality of computer device pools, each of the computer device pools including a plurality of computer devices; and
    at least one memory accessible to each of the computer devices in the plurality of computer device pools, the at least one memory being configured to store state information associated with client sessions involving client devices requesting the service,
    wherein at least two of the computer devices are each configured to:
        perform a portion of processing associated with a first client session involving a first client device, and
        forward state information regarding the processing to the at least one memory,
    wherein the at least one memory is configured to store the state information from the at least two computer devices, wherein the state information comprises at least one of time information associated with the portion of the processing performed in the first client session, an amount of data or location in a file downloaded to the first client device, or a bit rate associated with communications to the first client device.

2. The system of claim 1, wherein the at least two computer devices comprise a first computer device and a second computer device, wherein the second computer device is configured to:
    access the state information stored in the at least one memory that is associated with the processing performed by the first computer device, and
    use at least some of the stored state information when performing processing associated with the first client session.

3. The system of claim 2, wherein the at least two computer devices comprise a third computer device, wherein the third computer device is configured to access the state information stored by at least one of the first and second computer devices when an error occurs during the first client session.

4. The system of claim 1, wherein the at least two computer devices comprise a first computer device included in a first computer device pool and a second computer device included in a second computer device pool.

5. The system of claim 4, wherein the first and second computer device pools are associated with different ones of the plurality of load balancers.

6. The system of claim 1, wherein the service comprises at least one of downloading multi-media content or providing access to multi-media content.

7. The system of claim 1, wherein the at least two computer devices are each configured to access the at least one memory via a network.

8. The system of claim 1, wherein the first client session comprises receiving content at the first client device, and wherein the state information comprises an amount of data or location in a file downloaded to the first client device.

9. The system of claim 8, wherein the first computer device is configured to download a first portion of the content to the first client device, and
    wherein the second computer device is configured to download a second portion of the content to the first client device based on the state information.

10. A method, comprising:
receiving a request from a first client device for a service;
forwarding the request to first one of a plurality of computer device pools, each of the computer device pools including a plurality of computer devices;
forwarding, at the first computer device pool, the request to a first one of the computer devices;
performing, by the first computer device, a portion of processing associated with a first client session involving the first client device;
forwarding, by the first computer device, first state information regarding the processing to a memory;
storing the first state information in the memory, wherein the first state information comprises at least one of time or other information identifying the portion of the processing performed by the first computer device, an amount of data or location in a file downloaded to the first client device, or a bit rate associated with communications to the first client device;
performing, by a second computer device, an other portion of the processing associated with the first client session;
forwarding, by the second computer device, second state information to the memory; and
storing the second state information in the memory.

11. The method of claim 10, further comprising:
accessing, by the second computer device, the first state information, wherein the performing the other portion of the processing by the second computer device comprises:
performing, by the second computer device, processing associated with the first client session based on the first state information.

12. The method of claim 10, wherein the performing processing based on the first state information comprises:
identifying, by the second computer device, a portion of a file to be downloaded to the first client device, and
downloading, by the second computer device, the portion of the file to the first client device.

13. The method of claim 10, wherein the first computer device and second computer device are associated with different computer device pools that are not located together.

14. The method of claim 13, wherein the first and second computer device pools are associated with different ones of a plurality of load balancers.

15. The method of claim 10, further comprising:
accessing, by a third computer device, the first and second state information in response to detection of an error associated with the first client session; and
performing processing for the first client session based on the first and second state information.

16. The method of claim 10, wherein the request comprises a request for multi-media content, and wherein the performing a portion of the processing comprises:
forwarding, by the first computer device, at least a portion of the multi-media content to the first client device.

17. The method of claim 16, wherein the performing the other portion of the processing comprises:
forwarding, by the second computer device, a remaining portion of the multi-media content to the first client device based on the first state information.

18. The method of claim 10, wherein the first client session involves a banking transaction, and
wherein the performing, by the first computer device, a portion of the processing comprises retrieving banking information, and
wherein the performing, by the second computer device, an other portion of the processing comprises performing a security check based on information provided by a user associated with the first client device.

19. A system, comprising
a plurality of load balancers configured to receive requests associated with a service;
a plurality of computer pools associated with the plurality of load balancers, each of the computer pools including a plurality of computers; and
a memory accessible to each of the computers in the plurality of computer pools, the memory being configured to store state information associated with a client session involving a first client device requesting the service,
wherein a first one of the plurality of computers is configured to:
perform a portion of processing associated with the client session, and
forward first state information regarding the processing to the memory,
wherein a second one of the plurality of computers is configured to:
perform an other portion of the processing associated with the client session, wherein when performing the other portion of the processing, the second computer is configured to:
access the memory, and
perform processing for the client session based on the first state information, and
forward second state information to the memory,
wherein the memory is configured to store the first and second state information.

20. The system of claim 19, wherein the first computer and second computer are located in different ones of the plurality of computer pools.

* * * * *